(12) United States Patent
Siebert

(10) Patent No.: US 10,557,369 B2
(45) Date of Patent: Feb. 11, 2020

(54) DRAIN FOR A PRESSURE SENSING LINE

(71) Applicant: ROLLS-ROYCE plc, London (GB)

(72) Inventor: Annegret W Siebert, Derby (GB)

(73) Assignee: ROLLS-ROYCE plc, London (GB)

( * ) Notice: Subject to any disclaimer, the term of this patent is extended or adjusted under 35 U.S.C. 154(b) by 948 days.

(21) Appl. No.: 15/133,647

(22) Filed: Apr. 20, 2016

(65) Prior Publication Data

US 2016/0333723 A1 Nov. 17, 2016

(30) Foreign Application Priority Data

May 14, 2015 (GB) .................................. 1508217.5

(51) Int. Cl.
*F01D 17/08* (2006.01)
*G01L 19/06* (2006.01)
*F01D 25/32* (2006.01)

(52) U.S. Cl.
CPC .......... *F01D 17/08* (2013.01); *G01L 19/0654* (2013.01); *F01D 25/32* (2013.01)

(58) Field of Classification Search
CPC ..... F01D 25/32; G01L 19/0654; G01L 19/06; G01L 19/0618; G01L 19/027
USPC .............................................. 415/118, 169.2
See application file for complete search history.

(56) References Cited

U.S. PATENT DOCUMENTS

| | | | | | |
|---|---|---|---|---|---|
| 3,983,903 A | * | 10/1976 | Kuehn, Jr. | ........ | F16L 55/02718 138/40 |
| 4,234,008 A | * | 11/1980 | Cronfel | ..................... | F16T 1/34 137/182 |
| 6,539,977 B1 | * | 4/2003 | Hutchinson | ............. | F02C 7/232 138/40 |

FOREIGN PATENT DOCUMENTS

EP 2 631 437 A2 8/2013
EP 2660578 A2 11/2013

OTHER PUBLICATIONS

Dec. 22, 2015 Search Report issued Brittish Patent Application No. 1508217.5.

* cited by examiner

*Primary Examiner* — Justin D Seabe
*Assistant Examiner* — Cameron A Corday
(74) *Attorney, Agent, or Firm* — Oliff PLC

(57) ABSTRACT

The invention provides a drain to allow water to flow out of a pressure sensing line. The drain comprises a tube including a plurality of restrictors in flow series, each restrictor comprising a constriction whose internal diameter is less than the internal diameter of the tube.

14 Claims, 2 Drawing Sheets

DRAIN FOR A PRESSURE SENSING LINE

This disclosure relates to pressure sensing lines, and in particular to drains for removing water from such lines.

In the operation of a gas turbine engine, it is important to monitor temperatures and pressures at different positions within the engine. However, because of constraints of space and access, it is not always possible to measure these parameters directly in the location where the measurement is to be made. It is therefore known to carry a signal away from the point of measurement for use elsewhere. For example, electrical wires may carry an electrical signal from a sensor to a remote measurement unit.

In the case of pressure measurement, this is achieved by carrying the pressurised air through a pipe or tube, known as a pressure sensing line. An example of this is the P30 (high pressure compressor (HPC) exit) pressure, which is carried to the electronic engine controller (EEC) where it is used to control the engine. Typically, a P30 sensing line comprises tubing (which may be of varying diameter) routed from the combustion outer casing (at the HPC exit) to the EEC, where the HP6 pressure (the pressure at the exit from the sixth stage of the HPC compressor) is measured by a high-accuracy pressure transducer.

A problem with pressure sensing lines is that water can collect within them. This is especially prevalent under engine acceleration, when hot moist air from the HP6 exit enters the pressure sensing line. As this air makes its way towards the EEC it cools and water condenses out of it; naturally this water collects at the lowest points of the pressure sensing line.

It is known to provide a simple drain hole at the lowest point of the pressure sensing line, so that condensed water can drain out. Another known solution is shown in FIG. 1, in which a pressure sensing line 10 is provided with an orifice 14. A vertically-oriented bucket or water trap 12 is provided below the orifice 14. In use, the pressurised air providing the pressure signal flows along the pressure sensing line 10 as shown by the arrows P. A proportion of the air flow P flows through the orifice 14, as shown by the arrow D, carrying with it any collected water. An exit hole 16 is provided in a side wall of the water trap 12, at a distance 18 above the bottom of the trap, through which the air can escape, as shown by the arrow E. If the water level should rise to the level of the exit hole 16, any excess water will overflow through the exit hole 16.

During cold cycles or at high altitude the water in the sensing line can freeze; typically at cruise conditions the ambient temperature is around −50° C. and the temperature within Zone 1 (where the P30 sensing line is located) will only be slightly higher. In the first known arrangement described above, water may freeze in the sensing line; in the second arrangement, collected water in the water trap may freeze and if sufficient water collects and freezes then it may 'back up' into the sensing line. If enough ice forms to form a blockage across the inner walls of the sensing line, then the EEC will read a constant pressure signal and will fail to register any changes in pressure on the HP6 side of the blockage.

Both of these known solutions have significant disadvantages, in particular in selecting a suitable size for the drain hole or the orifice 14. If the hole or orifice is too small, then it is prone to blockage by debris from the pressure sensing line, and it will no longer drain effectively. On the contrary, if the hole or orifice is made large enough for blockage to be avoided, the mass flow of air through the pressure sensing line will cause its temperature to increase, potentially causing a fire risk. The loss of air through the pressure sensing line causes a reduction in the efficiency of the engine, which is undesirable. Also, the larger the loss of air through the drain hole or orifice, the greater the deterioration in the pressure signal reaching the pressure transducer, which affects the engine control. Known solutions therefore provide a drain hole or orifice whose size is an unsatisfactory compromise between avoiding blockage and avoiding detrimental effects on the engine's operation.

It would therefore be desirable to have a drain that reduces or overcomes the disadvantages of known arrangements, which provides effective drainage while simultaneously avoiding the risk of blockage, avoiding undesirably high temperatures or mass flows, and avoiding detrimental effects on the engine's operation or efficiency.

According to a first aspect, there is provided a drain for a pressure sensing line as set out in the claims. According to second and third aspects, there is provided a pressure sensing line and a gas turbine engine incorporating such a drain.

Embodiments of the invention will now be described in more detail, with reference to the attached drawings, in which FIG. 1 is a schematic illustration of a known drain, as already described;

Figure 1:
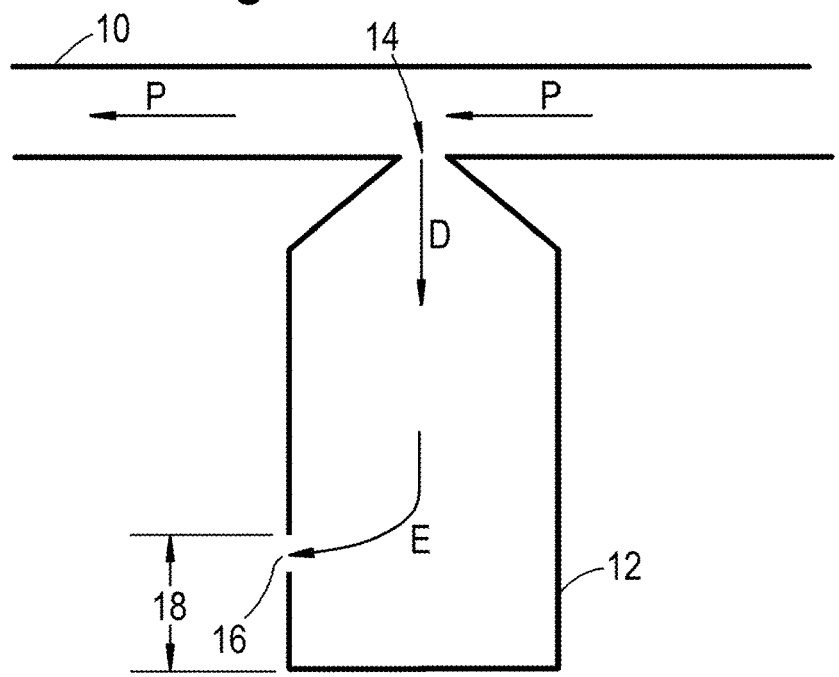
Figure 2:
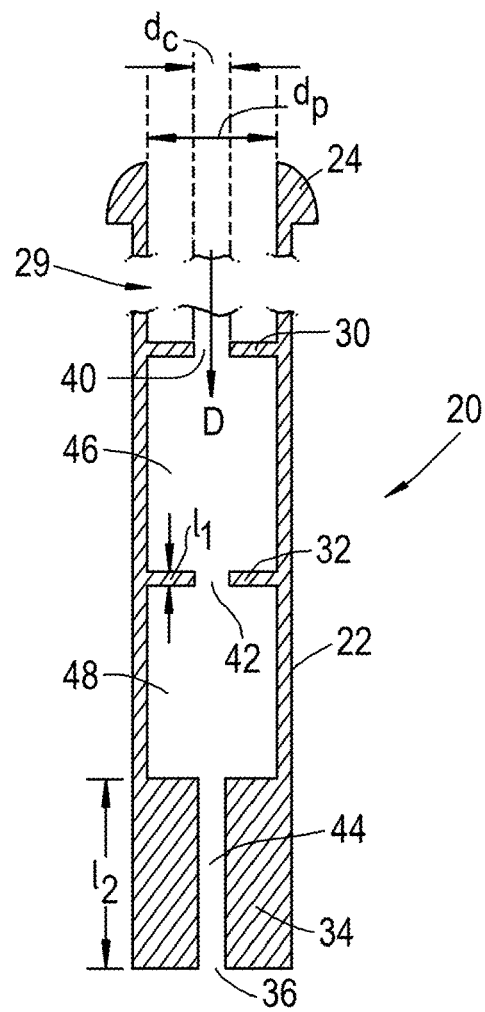
FIG. 2 is a schematic illustration of a first arrangement of a drain.

Referring to FIG. 2, a drain 20 comprises a drain pipe 22. In use, the drain 20 is mounted beneath a pressure sensing line by means of a T-piece connector, but these elements are not shown in FIG. 2. To facilitate the mounting, the drain is provided with a mounting feature 24 that is engageable in use with a corresponding mounting feature on the T-piece connector. In this embodiment, the mounting feature 24 comprises a male, spherical fitting which would engage in use with a corresponding female, conical fitting. In other embodiments, any suitable mounting features may be used, such as flanges or other known pipe connection features. The corresponding mounting features may be secured together by any suitable means, for example by clamps or threaded connectors, or by a method such as welding.

In use, a proportion of the air flowing through the pressure sensing line will flow through the T-piece connector and into the drain pipe, as shown by the arrow D, carrying with it any collected water. The direction D will be referred to as the flow direction. In contrast to the known arrangements, the size of the outlet from the pressure sensing line is not critical. In fact (as will be further explained below) in direct contrast to the known arrangements, the larger the orifice in the T-piece connector the better the drainage performance, but without the disadvantages of temperature rise and worse engine performance associated with known arrangements if larger orifices are employed.

The drain pipe has an internal diameter $d_p$. The drain pipe comprises a first restrictor 30, a second restrictor 32 and a third restrictor 34, each of which defines a constriction (respectively 40, 42, 44) in the pipe 22. Each constriction 40, 42, 44 has an internal diameter of $d_c$. The first and second constrictions 30, 32 each have a length $l_1$ in the flow direction; the third constriction 34 has a length $l_2$ in the flow direction. Between the mounting feature 24 and the first restrictor 30 is a section 29 of drain pipe 22, which is omitted from FIG. 2 for clarity. The length of this section is not critical to the operation of the invention.

The regions between successive pairs of restrictors 30, 32 and 32, 34 define first and second chambers 46, 48, whose purpose and operation will be explained below. Chambers 46, 48 have an internal diameter of $d_p$.

In use, air flows through the drain pipe 22 in the direction D from the drain hole (not shown) and through each restrictor 30, 32, 34 in series, escaping from the third restrictor 34 through an exit hole 36.

The air flow is accelerated as it passes into the first restrictor 30, forming a high-speed jet. Its dynamic head is thereby increased. As the air flows out of the first restrictor 30 into the first chamber 46 and the cross-sectional area of the passage increases, the flow is mixed out and the dynamic head is dissipated. The effect of the restrictor is to reduce the mass flow through the drain pipe 22, compared with a drain pipe without restrictor.

The first chamber 46 must be long enough to ensure that the jet cannot reach the second restrictor 32 without undergoing expansion; it is proposed that its length should be at least 1.5 $d_p$. The cross-sectional area $\pi d_p^2/4$ of the first chamber 46 should be at least three times as large as the cross-sectional area $\pi d_c^2/4$ of the first restrictor 30.

The same happens, mutatis mutandis, as the air passes into the second restrictor 32 and subsequently into the second chamber 48.

The same happens, mutatis mutandis, as the air passes into the third restrictor 34 and subsequently through the exit hole 36. The additional length of the third restrictor 34, compared with the other two restrictors, further reduces the mass flow through this restrictor by reducing the discharge coefficient Cd (typically from about 0.9 for a 'short' hole to about 0.6 for a 'long' hole).

Because the flow is reduced through three restrictors in series, each restrictor may reduce the flow by a lesser amount, so the internal diameter $d_c$ of the constrictions 40, 42, 44 may be larger than would be the case for a single restrictor. The individual restrictors are therefore less prone to blockage, so that effective drainage of water can always be achieved. At the same time, the presence of three restrictors in flow series allows the mass flow to be reduced by a sufficient amount to keep the temperature of the drain pipe acceptably low.

Mass flow through the drain pipe 22 may be further reduced by making two or all three of the restrictors 'long' (as third restrictor 34), but this would increase the length and weight of the drain 20, which may be disadvantageous. Conversely, it would be possible to construct a drain having only 'short' restrictors (as first and second restrictors 30, 32) which would be shorter and lighter, although the mass flow through such a drain would be somewhat higher.

Figure 3:
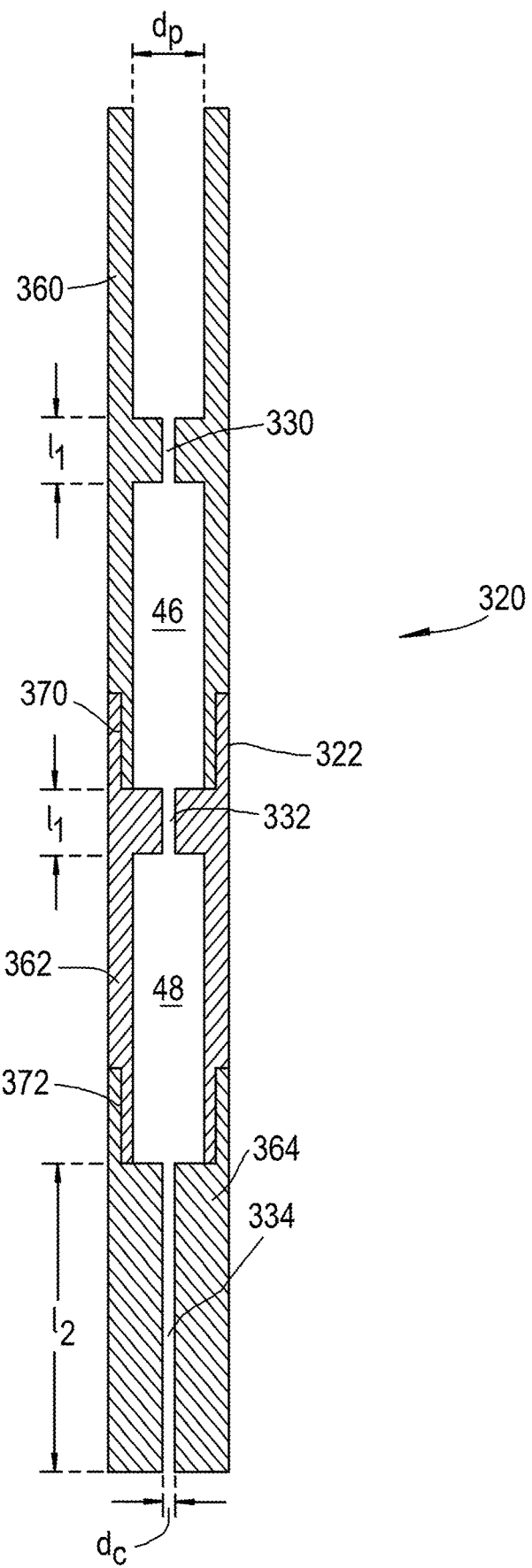
FIG. 3 is a cross-sectional view through a second arrangement of a drain.

In an alternative arrangement shown in FIG. 3, a drain 320 comprises a drain pipe 322. The drain 320 comprises three restrictions 330, 332 and 334. The internal diameter $d_p$ of the drain pipe 22 is 8.0 mm. The internal diameter $d_c$ of each constriction is selected to be between 0.5 mm and 3.0 mm, depending on the application. In other arrangements, the internal diameter $d_c$ may be between 0.2 mm and 3.0 mm and it is expected that the advantages of the invention will still be achieved. An internal diameter close to 3.0 mm, at the upper end of these ranges, will provide maximum protection against blockage as well as (through the operation of the invention) acceptable engine performance and temperature; in contrast, it will be appreciated that a simple drain hole of such a size would be quite unusable because of the effects on engine performance and operation and because it would lead to an unacceptable temperature rise. The length $l_1$ of the first and second restrictors is 4.0 mm and the length $l_2$ of the third restrictor is 31.0 mm. The length in the flow direction of each of the chambers 46, 48 is 27.0 mm.

To facilitate the manufacture of the drain of FIG. 3, it is constructed in a number of parts. Elements 360, 362, 364 are manufactured separately and then screwed together by means of cooperating screw threads 370, 372 to form the drain 320. This method of construction allows the constrictions and chambers to be accurately machined. Sealing rings or sealing surfaces (not shown in FIG. 3) may be incorporated in the elements 360, 362, 364 to ensure leak-free connections.

Alternatively, it would be possible to join the elements 360, 362, 364 by other means such as welding (welded joints have the advantage that they avoid any sealing issues in the finished drain). Other similar joining techniques might also be used, such as brazing, soldering and cold fusion. As an alternative to assembling the drain from separate elements, it would be possible to form the entire drain 320 in one piece by an additive manufacturing technique such as DLD, or to form it (in one piece or in several) using other known manufacturing techniques.

The arrangements described above have three restrictors. A skilled person will recognise that the advantages described may be realised using more than three restrictors in flow series, or even (to some extent) in an arrangement having only two restrictors. Other alternative or optional features will also be apparent to a skilled person when presented with this disclosure.

Any component or feature described in this disclosure may be combined with any other compatible component or feature. Furthermore, it will be appreciated that various alternative or complementary arrangements or components not explicitly described herein are in accordance with the disclosure.

The invention claimed is:

1. A drain for a pressure sensing line, the drain comprising a tube including a plurality of restrictors in flow series,
   wherein each restrictor comprises a constriction whose internal diameter is less than the internal diameter of the tube, and
   wherein the last restrictor in flow series has a greater length in the flow direction than the other restrictors, the last restrictor has a length $I_2$ and the other restrictors each have a length $I_1$ in the flow direction, and $I_2$ is between seven and eight times $I_1$.

2. The drain of claim 1, wherein the region between two successive restrictors defines a chamber.

3. The drain of claim 2, wherein the cross-sectional area of each chamber is at least three times the cross-sectional area of the constriction preceding the each chamber in flow series.

4. The drain of claim 2, wherein the length of each chamber is between seven and eight times the length of the restrictor preceding the each chamber in flow series.

5. The drain of claim 2, wherein the length of each chamber is between one-and-a-half and fifteen times the diameter of the constriction preceding the each chamber in flow series.

6. The drain of claim 1, wherein the plurality of restrictors comprises three restrictors.

7. The drain of claim 1, wherein the diameter of the constriction is between 0.25 and 0.40 times the diameter of the tube.

8. The drain of claim 1, wherein the diameter of the constriction is between 0.05 and 0.40 times the diameter of the tube.

9. The drain of claim 1, wherein the diameter of the constriction is between 0.5 mm and 3.0 mm.

10. The drain of claim 1, wherein the diameter of the constriction is between 0.2 mm and 3.0 mm.

11. A pressure sensing line, comprising the drain of claim 1.

12. The pressure sensing line of claim 11, wherein in use the drain is located at the lowest point of the pressure sensing line.

13. A gas turbine engine, comprising the drain of claim 1.

14. A gas turbine engine, comprising the pressure sensing line of claim 11.

\* \* \* \* \*